July 15, 1930.  H. G. L. DE WHALLEY  1,770,512
PORTABLE AERATOR
Filed Oct. 13, 1927   2 Sheets-Sheet 1

INVENTOR
H.G.L. de Whalley
by
ATTORNEY

July 15, 1930.  H. G. L. DE WHALLEY  1,770,512
PORTABLE AERATOR
Filed Oct. 13, 1927  2 Sheets-Sheet 2
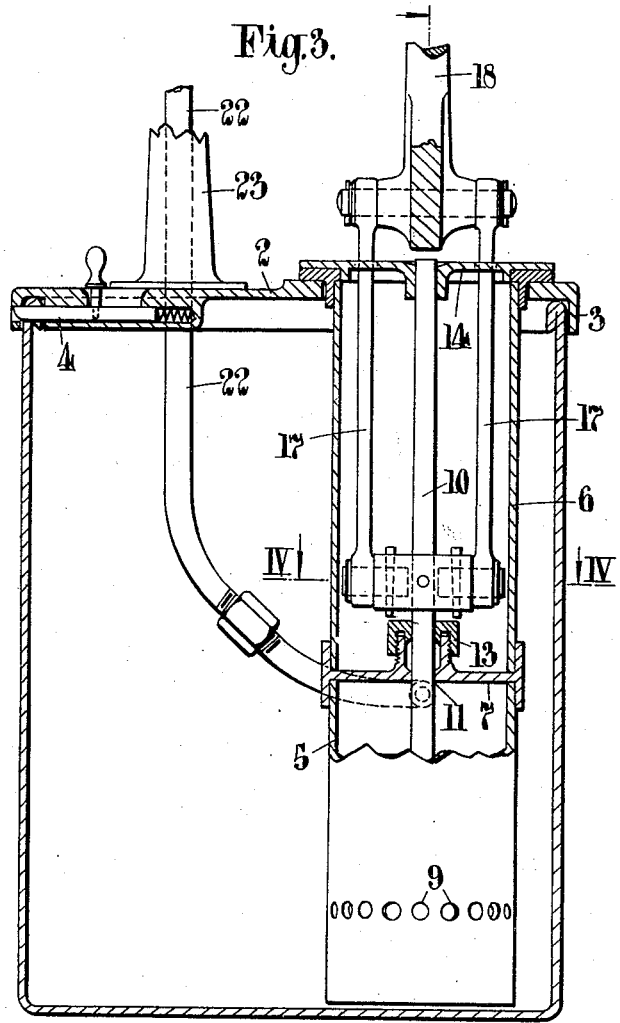
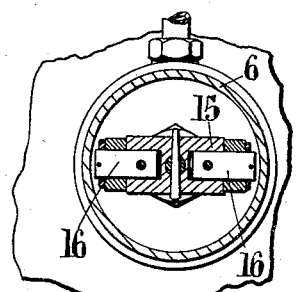
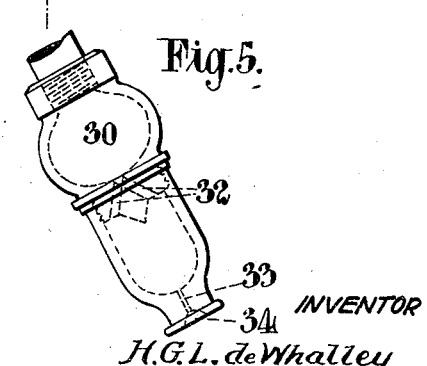
INVENTOR
H.G.L. de Whalley
BY
Jno Lairie
ATTORNEY Patented July 15, 1930

1,770,512

UNITED STATES PATENT OFFICE

HERMES GEORGE LAWRENCE DE WHALLEY, OF CARSHALTON, ENGLAND

PORTABLE AERATOR

Application filed October 13, 1927, Serial No. 226,024, and in Great Britain September 23, 1927.

This invention relates to a portable aerator. It is an object of the invention to provide a portable device adapted to contain a plain liquid such as water or a liquid beverage, food or the like, and this object may be extended to include disinfectants, insecticides and like liquids other than beverages or foods if desired.

It is a further object of the invention to provide a device comprising in combination a liquid container, a pump to pump liquid therefrom, and an aeration device mounted on a delivery nozzle adapted to aerate liquid forced therethrough by the pump.

It is a further object of the invention to provide an improved arrangement of parts which are generally metallic and include little or no fibre or leather fittings such as would be likely to perish in hot climates.

It is a further object of the invention to provide a device which will give a sealed closure to the liquid preventing the entry of impurities therein, such moving parts of the pump as require lubrication being housed in a separate chamber.

Figure 1:
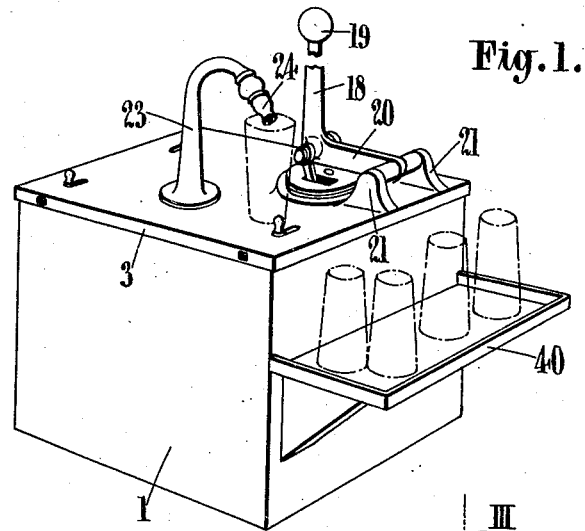
Figure 2:
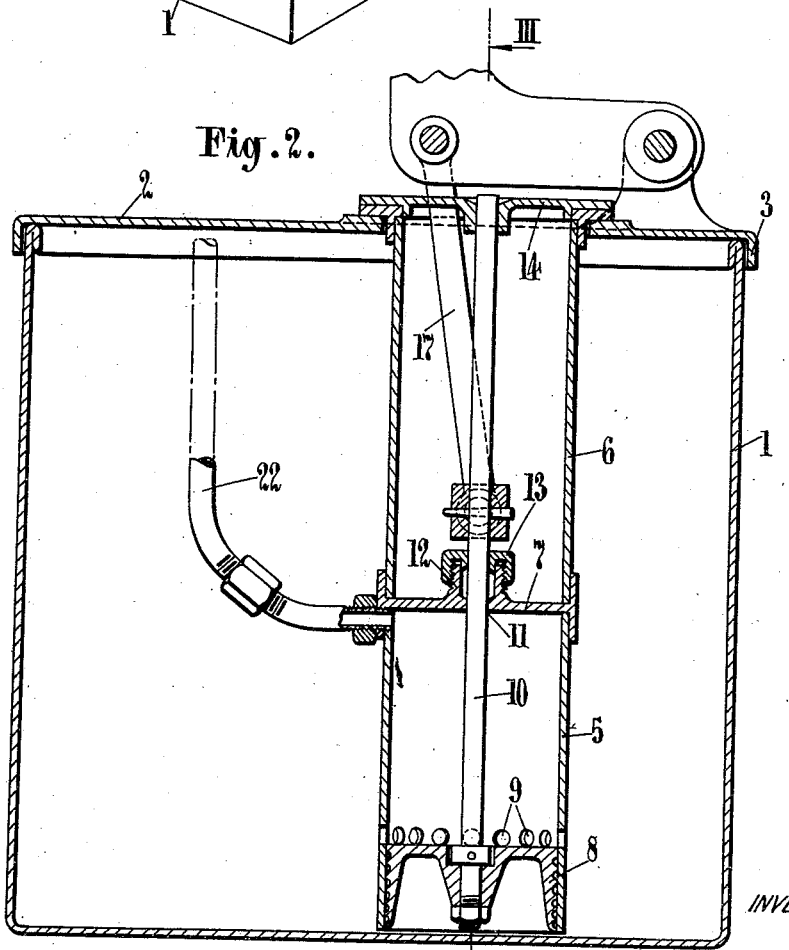

With these and other objects in view, the invention will now be described with reference to the accompanying drawings in which Fig. 1 illustrates a general view of a preferred form, Fig. 2 being a vertical sectional view of part of Fig. 1, And Fig. 3 being a sectional view on the line III—III of Fig. 2, Fig. 4 is a plan sectional view on the line IV—IV of Fig. 3, And Fig. 5 is a view of a detail, Figs. 2 to 5 are taken on an enlarged scale.

Referring now to the drawing, the device comprises a container 1 preferably formed of sheet metal and provided with a cover 2 integrally formed with a flange 3 to sit over the edge of container 1 with a tight fit. The cover 3 may be held down in any suitable manner as by the provision of one or more sliding catches 4, Figs. 1 and 3. The cover 1 has depending therefrom a pump chamber 5 extending beneath a pump housing 6, the pump chamber and housing being separated by a horizontal partition 7. The pump piston 8 is preferably metallic and works inside the chamber 5 with a sufficiently close fit, the chamber 5 being perforated or slotted freely as at 9 with valveless holes arranged at a point just above the top of the piston when it is at the bottom of its stroke, to permit liquid carried in the container 1 freely to enter into the chamber.

The pump piston 8 is mounted on a piston rod 10 passing upwardly through partition 7 which has a central hole 11 surrounded by an upstanding collar 12 adapted to house a gland secured by a nut 13 to close the hole 11 efficiently. The piston rod 10 extends through the top plate 14 of the housing 6 in the form of a guide rod. Secured to the piston rod 10 by means of a tapering pin is a cross-head 15 in which two laterally-extending pivots 16 are mounted by tapering pins. On the pivots 16 are mounted a pair of links 17 secured to the angle of a bell-crank lever 18 provided with an operating knob 19. The short arm of the lever 20 is fulcrumed in a pair of ears 21 mounted on the top of cover plate 2. A delivery pipe 22 extends from a port at the top of pump chamber 5 upwardly through the cover plate 2 where it is supported by a shroud 23. It is fitted at its end with an aerator 24 shown separately in Fig. 5.

The aerator illustrated is similar to that described in my co-pending patent application No. 214,713. Briefly it includes a pressure chamber 30 and a whirling chamber 31 communicating with the pressure chamber by capillary passages 32 so that liquid is delivered into the whirling chamber 31 with a sharp rotary motion. On emerging from the chamber 31 through a narrow passage 33 into a flared recess 34 at the mouth of the device, the liquid takes up air and is delivered in aerated form. The description of the aerator is merely by way of example, as the present invention is not limited to this construction of aerator.

A tray or stand 40 is preferably provided on one outer face of the container 1 to support glasses ready for use. Alternatively the delivery tube 23 may extend over the tray 40 which could then be used as a drip tray.

The operation of the device is as follows:—

The container 1 is filled with liquid and the cover plate 2 firmly secured. The delivery pipe 23 being open to the air liquid passes from the container 1 into the pump chamber 5 through the holes or slots 9. On drawing forward the operating knob 19 of bell-crank lever 18, pump piston 8 is raised in chamber 5 and liquid forced through the delivery pipe 22 to the aerator 24 whence it is delivered in aerated form. The liquid employed may either be pure water delivered into a glass containing a fruit cordial or the like, or a made-up beverage may be carried in the container 1. In either case, the invention provides a portable device whereby the liquid is delivered into the glass in highly areated form.

It will be appreciated that when the pump piston falls back either under gravity or under a return spring not shown, or otherwise, the back pressure will cause any liquid remaining adjacent the cup-shaped recess 34 to be drawn back into the pipe 23 and so minimize or prevent drip.

Obviously the device may be combined with any suitable means such as that of an outer jacket for cooling or heating the contained liquid.

Obviously, in larger models the pump may be arranged to be pedal operated and it is to be understood that this form of operation is included by the term "manual" in the following claims.

I claim:

1. A portable aerator comprising a liquid receiving tank, a cover plate removably secured to the upper open end of the tank, a housing removably secured to the cover plate and depending within the tank, a pump chamber underlying and in alignment with the housing and separated therefrom, a pump piston operative within the pump chamber, said pump chamber being formed with openings to establish communication with the interior of the tank surrounding the chamber, a cross-head operative in the housing and connected with the pump piston, a manually operable lever supported upon the cover and connected to the cross-head for operating the pump piston in both directions, and a delivery pipe in communication with the upper end of the pump chamber and leading to and rigidly supported beyond the cover of the tank.

2. A portable aerator comprising a liquid receiving tank, a cover plate removably secured to the upper open end of the tank, a housing removably secured to the cover plate and depending within the tank, a pump chamber underlying and in alignment with the housing and separated therefrom, a pump piston operative within the pump chamber, said pump chamber being formed with openings to establish communication with the interior of the tank surrounding the chamber, a cross-head operative in the housing and connected with the pump piston, a manually operable lever supported upon the cover and connected to the cross-head for operating the pump piston in both directions, a delivery pipe in communication with the upper end of the pump chamber and leading to and rigidly supported beyond the cover of the tank, and an aerator carried by the free end of the delivery pipe.

3. A portable aerator comprising a liquid chamber, a housing depending therein with ports adjacent the bottom thereof, a piston reciprocating in said housing so that in its lowest position it lies below said ports, means permitting the outlet of liquid from said housing below said piston when in its lowest position, a delivery passage extending from the upper part of said housing, whereby on lift of the piston, liquid which has entered said housing through said ports is ejected through said delivery passage, and liquid in said chamber enters said housing below said piston, the liquid below said piston being ejected into said chamber when said piston is depressed, so that the operation of delivery of liquid from said chamber is effected without necessitating the provision of a valve.

In testimony whereof I affix my signature.

HERMES GEORGE LAWRENCE de WHALLEY.